United States Patent [19]

Sobotta

[11] 3,843,247
[45] Oct. 22, 1974

[54] INTEGRALLY MOLDED CIRCULAR TRAY FOR PHOTOGRAPHIC SLIDES

[75] Inventor: Reinhard Sobotta, Mascherode, Germany

[73] Assignee: Rollei-Werke Franke & Heidecke, Braunschweig, Germany

[22] Filed: Mar. 23, 1973

[21] Appl. No.: 344,224

Related U.S. Application Data

[63] Continuation-in-part of Ser. No. 180,400, Sept. 14, 1971, Pat. No. 3,790,269, and a continuation-in-part of Ser. No. 276,962, Aug. 1, 1972, and a continuation-in-part of Ser. No. 278,765, Aug. 8, 1972.

[30] Foreign Application Priority Data

Mar. 30, 1972 Germany.......................... 7212170

[52] U.S. Cl..................... 353/117, 353/120, 206/73
[51] Int. Cl. ............................................. G03b 23/06
[58] Field of Search................... 353/116, 117, 120; 220/22.3, 21

[56] References Cited
UNITED STATES PATENTS 3,413,062  11/1968  Zillmer ............................. 353/117
3,469,910  9/1969   Badsiich........................... 353/117
3,704,943  12/1972  Rube................................. 353/117

Primary Examiner—Louis R. Prince
Assistant Examiner—A. Jason Mirabito
Attorney, Agent, or Firm—Stonebraker & Shepard

[57] ABSTRACT

A horizontally arranged circular magazine for a picture slide projector, of the type in which a ramp is provided for raising picture slides as rotation of the magazine carries successive slides to a point opposite the projection position, so that the bottom edge of the slide will clear the top edge of the low outer cylindrical wall of the magazine, a pusher mechanism then pushing the slide horizontally in a radial direction with respect to the circular magazine into the projection position within the projector. The radial partitions of the magazine, which separate individual slides from each other, are tapered to narrow in a downward direction through the major part of the radial extent of each partition, to provide upper edges which are thick enough to withstand normal usage, while the radially outermost portions of the partitions as well as the radially innermost portions thereof (overlying the inner cylindrical wall) are oppositely tapered, thinner at the top than at the bottom.

7 Claims, 4 Drawing Figures

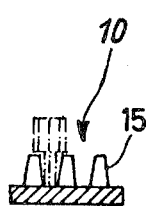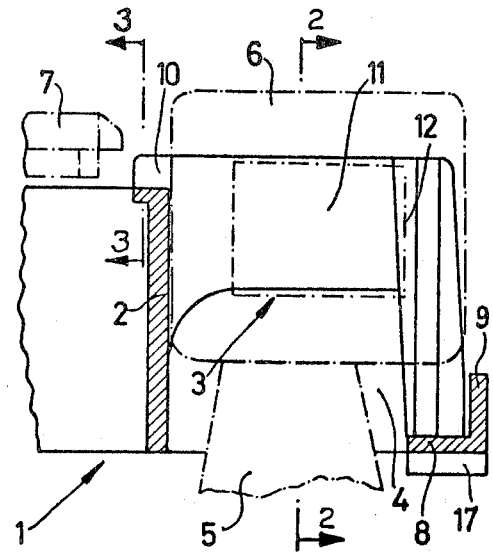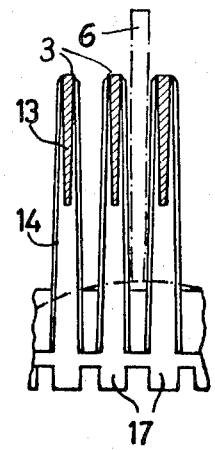
Fig. 3  Fig. 1  Fig. 2
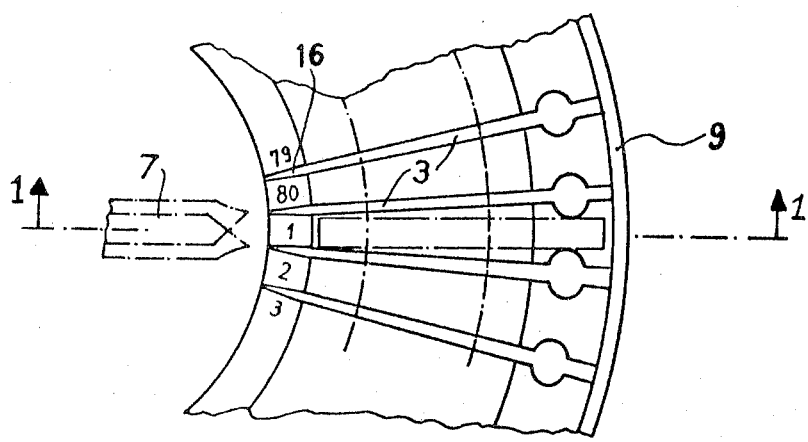
Fig. 4

INTEGRALLY MOLDED CIRCULAR TRAY FOR PHOTOGRAPHIC SLIDES

CROSS REFERENCE TO RELATED APPLICATIONS

This application is a continuation-in-part of copending applications Ser. No. 180,400, filed Sept. 14, 1971, (now Pat. 3,790,269, granted Feb. 5, 1974) and Ser. No. 276,962, filed Aug. 1, 1972, and Ser. No. 278,765, filed Aug. 8, 1972.

BACKGROUND OF THE INVENTION

Various forms of circular magazines for slide projectors are known in the art. In one known form, the magazine is mounted in a horizontal position on top of the projector, and successive slides are moved downwardly, through an opening in the bottom of the magazine, into projection position in the projector beneath the magazine. In still another type of circular magazine, the magazine is mounted in a vertical position rather than a horizontal one, with the axis of rotation extending horizontally, crosswise to the optical axis of the associated projector, and successive slides are moved horizontally from the magazine to projection position in the optical axis of the projector. In a third type of circular magazine, the magazine is arranged horizontally as in the first type mentioned, but is placed to one side of the projector rather than being mounted on top of the projector, and a stationary ramp in a ramp groove or recess in the bottom of the magazine raises successive slides, as the magazine turns, enough so that the bottom edge of the slide to be projected will clear the top of a low outer cylindrical wall on the magazine, the slide then being shifted horizontally from the magazine into the body of the projector, to projection position in the optical axis. It is particularly to this third type of circular magazine that the present invention relates, although some of the features of the invention may be advantageously used with circular magazines of the other types above described.

The prior art magazines or trays have usually been manufactured from two parts. One portion consists of an injection molded part with the compartment walls, and the other portion forms the bottom, which is then fitted beneath the injection molded part and usually consists of a different material.

In order that the injection molded part may be produced by injection molding of synthetic plastic material, the compartment walls must be tapered in thickness, so as to have a "lift-out" slope or taper, sometimes called "draft," to enable the injection molded part to be taken out of the mold. If these lift-out slopes are so arranged that the compartment walls taper upwardly, the thinnest part of the compartment all occurs at the upper edge of the slide tray. The thin upper edge of the compartment walls is undesirable on account of the action of the slide changer push member at this point, where the slide changer pusher may possibly make accidental engagement with the thin partition and break it. As will be seen from the copending applications above mentioned, the pusher member of the slide changer has a pusher arm operating at the approximate elevation of the top edge of the partitions of the slide tray or magazine, and because of the manufacturing tolerances and necessary play of the parts, this pusher arm may accidentally engage the upper edge of a partition in the tray, and cuase damage. The closest possible packing of the slides in the circular tray is not obtained from the compartment wall thicknesses at the upper edge of the cylindrical inner wall of the tray, which are just thick enough to be tolerable for mechanical strength of the circular magazine, but from the accuracy of the centering of the slide changer push member. Too slight a thickness of the partition or compartment wall at the upper edge, would lead to incorrect operation and failure in slide changing.

Thus one must provide a sufficiently thick partition or compartment wall at the upper edge, in order to avoid these possible incorrect operations of the slide changer push member. In order to avoid unnecessary consumption of material for the lift-out slopes of the compartment walls, the compartment walls are narrowed or tapered in the axial direction downwardly. But with such a design, as used in the prior art, one is compelled to produce the bottom separately and fit it to the injection molded upper part of the tray or magazine.

The present invention is addressed to the problem of producing a simply manufactured horizontal circular magazine or tray consisting of a single integrally molded member produced by injection molding, without the addition of a bottom, for use with slide changer systems with a ramp for raising the slides, which tray has great operational reliability and maximum saving of material, and which can be operated even with the existing centering tolerances of slide changer mechanisms designed for use with universal rod type or straight line type trays, where the tolerances of the changer mechanism are usually somewhat greater than those for use with circular trays.

SUMMARY OF THE INVENTION

According to the present invention, this problem is solved by providing compartment walls or partitions having a middle zone which extends from the inner cylindrical wall of the tray radially outwardly to a little beyond the radially outward edge of the ramp, which middle zone of each partition is tapered or narrowed in thickness in a downward direction, while the inner zone of each partition (over the inner cylindrical wall of the tray) and the outer zone of each partition (radially outwardly beyond the above mentioned middle zone) are tapered or narrowed in thickness in an upward direction. This divided lift-out form of the compartment walls or partitions (molded, of course, in a suitably split mold) had the advantage that the maximum thickness of the partition exists at the point where it is most needed, namely, at the upper edge, throughout the above mentioned middle zone in a radial direction, the thickness being needed here on account of the available maximum centering accuracies of the slide changer mechanism. A further advantage consists in the saving of material as compared with the circular trays or magazines in which the compartment walls are tapered to narrow in an upward direction. In comparison with those magazines of the prior art in which the compartment walls are tapered to narrow in a downward direction, the present construction has the advantage that the production and assembly time for the separate bottom of the magazine is saved.

BRIEF DESCRIPTION OF THE DRAWINGS

FIG. 1 is a fragmentary axial section taken radially through a fragment of a magazine or tray according to a preferred embodiment of the invention, the section being approximately on the line 1—1 of FIG. 4;

FIG. 2 is a vertical section taken approximately on the line 2—2 of FIG. 1;

FIG. 3 is a vertical section taken approximately on the line 3—3 of FIG. 1; and

FIG. 4 is a top plan view of the structure shown in FIG. 1.

DESCRIPTION OF THE PREFERRED EMBODIMENT

A fragment of the circular tray or magazine according to the present invention is shown in FIGS. 1 and 2. The tray is indicated in general by the numeral 1. It has an inner cylindrical wall 2, and radial partitions or compartment walls 3 subdividing the circumferential space of the tray into a large number of compartments each adapted to contain a single picture slide. The partitions 3 do not go all the way to the bottom of the magazine, the lower edges of the partitions, through the major part of their radial length from the inner circular wall 2 outwardly, being at an elevation at some distance above the bottom of the tray. This provides an annular recess 4 in the bottom of the tray, for receiving a stationary ramp 5 when the tray is mounted in proper position with realtion to the associated projector. Such a ramp is shown in FIG. 2 of the drawings of the above mentioned copending application Ser. No. 180,400. As well understood in the art, when the tray or magazine rotates, the ramp pushes successive slide 6 vertically upwardly in its individual compartment as the slide approaches projection position, so that by the time a given slide has reached the position where it should be taken out of the magazine and put into the projection gate of the projector, the bottom edge of the slide is high enough to clear the low outer rim or wall of the tray. Upon arrival at the proper place, the slide 6 thus raised by the ramp 5 is pushed laterally in a radially outward direction, by the pusher 7 of the slide changing mechanism, to transport the slide to a position intersecting the optical axis of the projector, at the projection gate or location of the projector. One form of pusher mechanism for pushing the slide from the tray into the projection gate is illustrated in the above mentioned copending application Ser. No. 180,400. Further details of the slide pushing mechanism are disclosed in the above mentioned copending application Ser. No. 276,962.

Radially outwardly from the ramp 5, the tray of the present invention is provided with a narrow annular bottom wall 8 on which part of the bottom edge of the picture slide rests when the slide is not elevated by the ramp. At the outer edge of this bottom wall 8 is the upwardly extending outer cylindrical wall 9 of the tray, this wall 9 being of much less height than the inner cylindrical wall 2, so that the ramp 5 needs to lift the slide 6 only a small distance until the bottom edge of the slide can clear the top of the wall 9 so that the slide can be moved radially to the optical projection gate of the projector.

In order to enable the simple and practical production of the slide tray by an injection molding process, and to enable the entire tray to be molded as a single integral piece without requiring subsequent assembly of a separately formed bottom, and at the same time to mold the structure economically with a minimum amount of molding material such as synthetic plastic, the various walls are formed as follows: In the central zone from the inner cylindrical wall 2 outwardly in a radial direction to a point a little beyond the radially outward edge of the ramp 5, the partitions or compartment walls 3 have a downwardly narrowing or downwardly tapered cross section, as indicated at 13 in FIG. 2. In this central zone of each partition, it is the top edge of the partition which is thickest, to have the greatest resistance to possible contact with the slide changing pusher 7, or accidental contact with other objects which may accidentally engage the top of the partitions. In the inner zone 10, radially inwardly from the outer face of the inner cylindrical wall 2, each partition or compartment wall is tapered in an upward direction as shown at 15 in FIG. 3. In the outer zone 12, radially outwardly beyond the above described central zone 11, each partition or compartment wall is also tapered upwardly as shown at 14 in FIG. 2. The article is molded in a sectional mold, of course, so arranged that the mold sections which define the inner zone 10 and the outer zone 12 of the partitions are drawn upwardly and the mold section defining the central zone 11 of the partitions is drawn downwardly, when the mold is opened to remove the finished molded article. These terms "upwardly" and "downwardly" with reference to the opening movement of the mold are, of course, used merely for convenience of description, since the mold parts may be oriented in any desired way in the molding machine.

This division of the compartment walls or partitions 3 into three different zones 10, 11, and 12 has the advantage that the separate production and additional fitting of the annular bottom 8 is eliminated, and that the compartment wall sections which extend radially outwardly beyong the outer edge of the cylindrical inner wall 2 have their greatest thickness at that point where a specific minimum necessary compartment wall thickness must be present in order to avoid incorrect operation when using existing slide changer mechanisms. Thus optimum functional reliability is achieved with simultaneous saving of material.

In FIGS. 3 and 4, the inwardly and upwardly narrowing central webs (inner zones of the compartment walls) 16 are illustrated. They guide the centering path secured to the slide changer push member 7, and permit satisfactory access of the changer mechanism to the individual slides 6.

A further advantage of the invention is that the compartment bottom 8 may have downwardly narrowing or downwardly tapered transport teeth 17 on its underside. This eliminates the necessity of careful adjustment of the position of the transport teeth 17 with respect to the partitions or compartment walls, which careful adjustment is necessary in the prior art constructions where the transport teeth are on a separate bottom member which must be assembled to the upper member containing the compartment partitions. In the use of a slide tray, these transport teeth 17 are engaged by the feeding pinion which causes the step-by-step circular travel of the magazine, as well understood in the art, and it is therefore necessary to have the teeth correctly aligned with the partitions so that the step-by-step movement will correctly align the slide compartments with the pusher mechanism. The difficulties of aligning the teeth with the partitions constitute a sometimes troublesome problem when the teeth are on one part and the partitions are on another part to be joined to each other in assembly, but the problem does not exist when the teeth are integrally molded as part of a single unitary structure which also includes the compartment partitions, as in the present invention.

What is claimed is:

1. A circular tray for holding photographic slides in a series of radially extending compartments, said tray comprising an inner cylindrical wall, and outer cylindrical wall of less height than the inner cylindrical wall, a series of radial partitions extending from the inner cylindrical wall to the outer cylindrical wall, each partition having a central zone in which the cross section of the partition is tapered downwardly from a relatively thick upper edge to a substantially thinner lower edge, an inner zone radially inwardly from said central zone, and an outer zone radially outwardly from said central zone, the cross section of the partition being tapered upwardly in said inner zone and in said outer zone.

2. A tray as defined in claim 1, in which said tray has a bottom extending part way inwardly from the lower edge of said outer wall toward the lower edge of said inner wall, leaving a gap between said bottom and said inner wall to provide an annular recess for receiving a slide-elevating ramp when the tray is in use in association with a projector.

3. A tray as defined in claim 1, wherein said inner zone of each partition extends radially inwardly over the top edge of said inner cylindrical wall.

4. A tray as defined in claim 1, in which the bottom edge of said central zone of each partition is at an elevation substantially above said bottom, and in which said outer zone of each partition extends downwardly to meet said bottom.

5. A tray as defined in claim 1, in which transport teeth are formed on the lower surface of said bottom, said transport teeth being tapered in a downward direction.

6. A tray as defined in claim 5, in which said tray is formed as a single integral molded article.

7. A tray as defined in claim 1, in which said tray is formed as a single integral molded article.

* * * * *